Dec. 16, 1958 ÅKE ARBORGH 2,864,598
FILTER FOR CLEANSING OF A DUST-CONTAMINATED
GASEOUS MEDIUM
Filed March 1, 1955

INVENTOR:
ÅKE ARBORGH
BY
Howson & Howson
ATTYS.

United States Patent Office 2,864,598
Patented Dec. 16, 1958

2,864,598

FILTER FOR CLEANSING OF A DUST-CONTAMINATED GASEOUS MEDIUM

Åke Arborgh, Jonkoping, Sweden, assignor to Aktiebolaget Svenska Flaktfabriken, Stockholm, Sweden Application March 1, 1955, Serial No. 491,463

Claims priority, application Sweden March 2, 1954

1 Claim. (Cl. 261—80)

The present invention relates to a filter for cleansing of a dust-contaminated gaseous medium consisting of two or more rotating endless filtering bands arranged one after another in the passageway of the medium, which bands by mechanical means are forced to pass through an oil trough and the freshly oiled parts of which pass said medium for collecting the contaminations from the medium.

In filters of this kind the medium has to pass twice through the filter band, the greater part of the contaminations being precipitated during the first passage and dust and finer particles being separated during the passage through the second part of the band. In order to increase the separating efficiency it is known practice to arrange two or more of such filter bands in sequence in the passageway of the medium, the perforation area of the successive filter bands preferably decreasing in the flowing direction of the medium. When using more bands in series the dust layer on the last band will be thinner with a greater risk that the passing medium carries away oil drops. For eliminating this drawback the speed of the flowing medium must be reduced which in turn necessitates greater filter areas and increased costs than what otherwise would be necessary.

The object of the present invention is to eliminate said drawback without a reduction of the speed of the flowing medium, which otherwise would be necessary, so that the size of the filter only is determined by the actual medium quantity and concentration of dust. The invention is based upon the knowledge that the risk of carrying away of the oil drops by the medium current is eliminated if the last filter band and especially the last part or run of which—as reckoned in the flowing direction of the medium— is given a less quantity of oil than the other filter bands. In accordance with the invention this is obtained by giving the last filter band a lower linear speed than the other and by causing the band to rotate in such a manner that the last part or run of said band moves downward towards the oil trough. This arrangement does not involve any disadvantage with respect to the separating efficiency since owing to the thinner dust layer, this band does not require the same washing and oiling as do the other filter bands.

Figure 2:
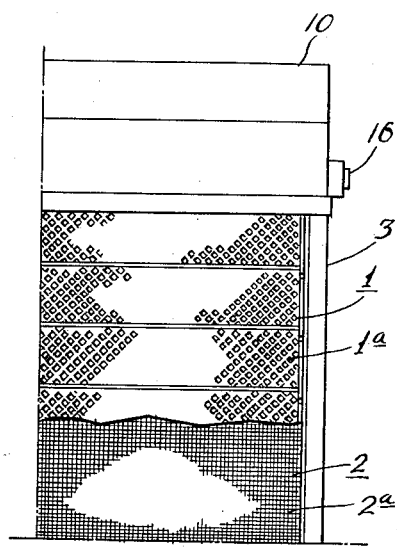
Figure 1:
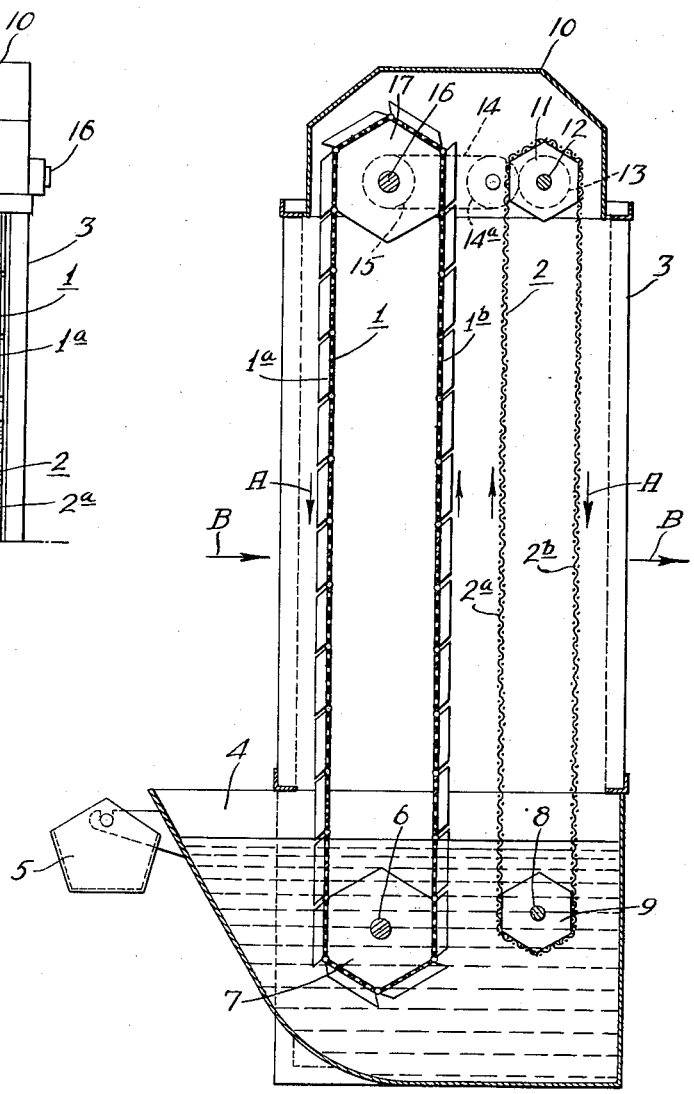

The invention will now be more specifically described with reference to the accompanying drawing, wherein:

Fig. 1 is a vertical cross section of a filter embodying the present invention; and Fig. 2 is a fragmentary view in front elevation with portions broken away to illustrate the character of the filter bands.

In the drawing, 1 and 2 designate two filter bands arranged in series, the two parts or runs of which being designated 1a, 1b and 2a, 2b respectively. The bands are extending between the axles 16, 6 and 12, 8 respectively, said axles being supported in a frame structure 3 and provided with sprocket wheels 17, 7 and 11, 9 respectively. The filter bands are driven by means of a driving device (not shown in the drawing) connected for instance to the axle 16. In the illustrated embodiment the driving axles of the two filter bands are connected by means of a sprocket 15, a chain 14, and a sprocket 14a which drives a sprocket 13, so that the sprocket wheels 15 and 13 respectively are caused to rotate with the same angular speed but in different directions. The moving direction of the different parts or runs of the bands are designated with the arrows A. Because the filter band 2 runs over sprocket wheels with a smaller diameter than that of the first band, the speed of the second band in accordance with the invention will be lower. This reduction of the speed may also be obtained by a fabrication of the sprocket wheel 13 with a greater diameter than that of the sprocket wheel 15, in which case the filter bands and the sprocket wheels have the same dimensions. Around the upper axles of the filter bands there is arranged a hood 10 on the frame structure 3, which hood shields the upper part of the filter bands from the gaseous medium flowing in the direction indicated by the arrows B. The lower part of the frame structure is designed as a trough 4 filled with a suitable filtering liquid for the cleansing and oiling of the filter bands. 5 designates a slime-container arranged at one side of the trough for collecting of slime being scratched or scraped from the bottom of the trough.

The filter band which first passes the dust-contaminated gaseous medium may suitably consist of pivotally connected sheets of perforated iron, frames filled with filtering bodies of expanded sheet metal or the like. The filter band which finally passes the gaseous medium on its passageway through the filter according to a suitable performance consists of a fine mesh wire screen without any filling of additional filtering elements.

What I claim is:

A filter for cleansing dust-contaminated gaseous medium by oil and removing the oil entrained in the cleansed air comprising a housing structure having at one end an entrance for said medium and at the other end an exit for said medium, a hood mounted on the upper portion of said housing structure, an oil trough in the lower portion of said housing structure, a first pair of vertically aligned upper and lower sprocket wheels mounted adjacent the entrance end of said housing structure, a second pair of vertically aligned upper and lower sprocket wheels spaced from said first pair and mounted adjacent the exit end of said housing structure, the upper sprocket wheels being disposed in said hood above the path of movement of said medium and the lower sprocket wheels being submerged in said trough below the path of movement of said medium, said first upper sprocket wheel being of larger diameter than said second upper sprocket wheel, common drive means for said upper sprocket wheels driving them at the same angular velocity and in opposite directions, a first band for cleansing the medium trained about said first pair of sprocket wheels and consisting of a plurality of pivotally interconnected elements containing filtering bodies of expanded metal, a second band for both cleansing the medium and removing oil drops entrained in the medium, trained about said second pair of sprocket wheels and consisting of a single continuous fine-mesh wire screen, the drive means advancing the bands through said trough to oil the runs thereof for collecting the contaminations from the medium, the drive means driving the runs having expanded metal filtering bodies to move downwardly into the oil trough adjacent the entrance end of the housing to discharge into the oil trough the major portion of said collected contaminations, the drive means thereby also driving the run of fine-mesh wire screen adjacent the exit end of the housing to move downwardly into the oil trough, whereby said run is drier than the previous runs and collects oil drops from the medium discharged from the housing, the difference in sprocket diameter causing the last of the filter bands to run at a lower speed than the first filter band to reduce the oiling of said last band relative to the oiling of the first band.

References Cited in the file of this patent

UNITED STATES PATENTS

| | | |
|---|---|---|
| 1,817,442 | Martin | Aug. 4, 1931 |
| 1,826,508 | Decker | Oct. 6, 1931 |
| 2,511,295 | Roop | June 13, 1950 |

FOREIGN PATENTS

| | | |
|---|---|---|
| 551,669 | France | Jan. 11, 1923 |
| 692,801 | Germany | June 27, 1940 |